Dec. 12, 1939.   W. P. SCHMITTER   2,183,507
VARIABLE SPEED TRANSMISSION
Filed May 18, 1936   2 Sheets-Sheet 1

INVENTOR.
Walter P. Schmitter
BY
ATTORNEY.

Dec. 12, 1939.    W. P. SCHMITTER    2,183,507
VARIABLE SPEED TRANSMISSION
Filed May 18, 1936    2 Sheets-Sheet 2

INVENTOR.
Walter P. Schmitter
BY
ATTORNEY.

Patented Dec. 12, 1939

2,183,507

UNITED STATES PATENT OFFICE 2,183,507

VARIABLE SPEED TRANSMISSION

Walter P. Schmitter, Milwaukee, Wis., assignor to The Falk Corporation, Milwaukee, Wis., a corporation of Wisconsin Application May 18, 1936, Serial No. 80,234

13 Claims. (Cl. 74—281)

This invention relates to variable speed transmissions of the type involving a set of inclined tapered planet rollers and a control element contacting said rollers and shiftable lengthwise thereof to regulate their planetary action.

A variable transmission of this general type, and which has proven commercially successful, is disclosed in the copending application of myself and Alfred G. Bade, Serial No. 52,095, filed November 29, 1935. In the transmission therein disclosed, the control element is in the form of a ring which encircles and contacts the rollers, the required contact pressures between the rollers and ring being maintained by a pressure inducing device which functions to force the rollers along their outwardly inclined axes. This results in a peculiar reaction between the rollers and ring which limits the degree of contact pressures thus obtained and which prevents automatic reduction of those pressures as the load on the transmission decreases, so that when operating at light loads the contact pressures are unnecessarily high and subject the transmission to unnecessary wear and tear.

One object of the present invention is to provide, in a transmission of the character mentioned, a novel combination and arrangement of parts which will render the contact pressures between the rollers and the contact element automatically responsive to the torque load on the transmission so as to avoid unnecessarily high contact pressures when operating under light loads and at the same time assure sufficiently high contact pressures to sustain heavy loads.

Another object is to provide improved means for automatically increasing the contact pressures between the rollers and the control element as the output speed decreases.

Other more specific objects and advantages will appear, expressed or implied, from the following description of two illustrative embodiments of the present invention.

Figure 1:
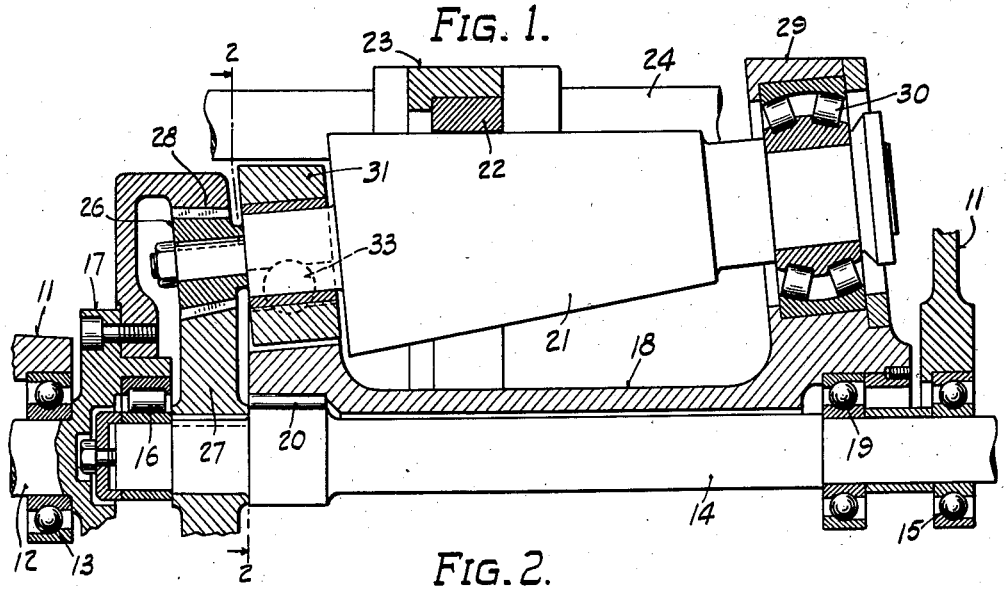
Figure 1 is a fragmentary longitudinal sectional view of a variable speed transmission constructed in accordance with the present invention.

Each of the variable speed transmissions shown in Figs. 1 to 4 comprises a driven shaft 12 journalled in a bearing 13 in a frame or housing 11, portions only of which are shown. A drive shaft 14, aligned with the driven shaft 12, is journalled in a bearing 15 at the opposite end of the frame 11, and in a bearing 16 mounted in a head 17, fixed on the end of the driven shaft 12. A rotor 18, freely rotatable about the drive shaft 14, is mounted thereon by bearings 19 and 20, and carries a set of inclined tapered rollers 21 so arranged that their outermost sides extend parallel to the common axis of the shafts 12 and 14.

The several rollers 21 coact with a control element in the form of a ring 22 which encircles and contacts the rollers and which is carried by a ring 23 axially movable along a supporting guide rod 24 and screw shaft 25 mounted parallel to the common axis of the shafts 12 and 14.

The arrangement thus far described is similar to that disclosed in the copending application above identified, the rings 22 and 23 being shiftable lengthwise of the rollers 21 by rotation of the screw 25.

Also, as in the application above identified, a pinion 26 is fixed to each roller 21 at the larger end thereof, the several pinions 26 being disposed to mesh with a central sun gear 27, fixed to the drive shaft 14, and also with a surrounding internal ring gear 28 fixed to the head 17 of the driven shaft 12. In this instance, sufficient clearance is provided between the teeth of these intermeshing gears to permit slight radial displacement of the pinions 26 relative to the gears 27 and 28 and thereby allow slight freedom of movement of the adjacent roller ends for a purpose which will later appear.

In both of the transmissions herein shown, each of the rollers 21 is rockably mounted at its smaller end in an end head 29 of the rotor 18, by means of a spherical or self-aligning bearing 30 of a well known type, which provides a fixed fulcrum for that end of the roller permitting angular displacement of the roller about the center of the bearing.

Figure 2:
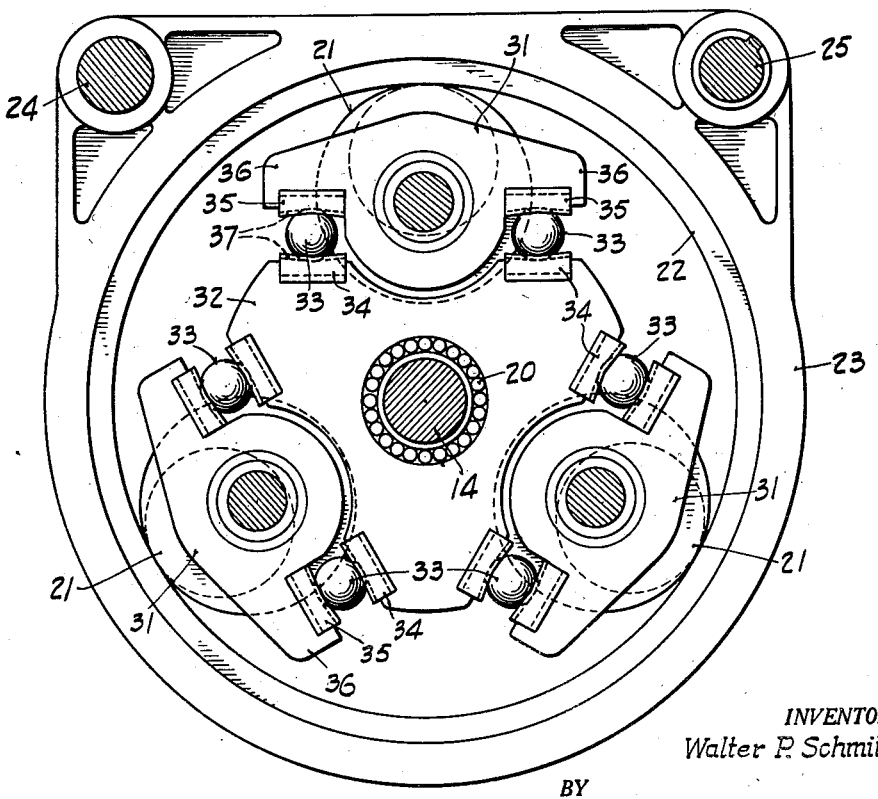
Fig. 2 is a transverse sectional view taken on the line 2—2 of Fig. 1.

In the transmission shown in Figs. 1 and 2, each of the rollers 21 is journalled at its larger end in a bearing block 31 movably mounted upon the other end head 32 of the rotor 18. Each block 31 is shown supported on a pair of balls 33 disposed at opposite sides thereof, each ball 33 being interposed between a cam plate 34 fixed to the rotor head 32 and a similar cam plate 35 fixed to a lateral projection 36 of the bearing block. The plates 34 and 35 are provided with ball retaining cam grooves 37 which are deepest at their mid-points, and which coact with the balls 33 and through the bearing blocks 31 to retain the rollers 21 outwardly against the encircling contact ring 22.

The arrangement is such that, in response to any force tending to displace the bearing blocks 31 and rollers 21 tangentially of the rotor, the balls 33 and cams 34 and 35 react instantly to press the rollers 21 laterally outward more firmly against the encircling ring 22, so as to increase the contact pressures between the rollers and ring to a degree dependent upon the magnitude of such force, and any subsequent reduction in such force instantly results in a corresponding reduction in those contact pressures. It will of course be understood that the reactions of the driving sun gear 27 and the driven ring gear 28 on the planet pinions 26, together with the tangential reaction of the ring 22 on the rollers 21, develop forces which urge the rollers and their bearing blocks 31 tangentially, that the magnitude of those forces is proportional to the torque load on the transmission, and that the balls 33 and cams 34 and 35 react under those forces to vary the contact pressures between the rollers 21 and ring 22 in accordance with variations in the torque load.

It will also be noted that the outward thrust of the bearing blocks 31 against the rollers 21 is sustained solely by the ring 22 and the reaction of the fulcrum bearing 30 of each roller, so that the contact pressures between the rollers and ring, resulting from that thrust, varies as the ring is shifted along the rollers. That is to say, when the ring is positioned to contact the rollers at their larger ends the contact pressures are at a minimum and those pressures automatically increase as the ring is shifted toward the smaller ends of the rollers, that is, toward the fulcrum bearing 30. It is of course understood that the speed of the driven shaft 12 decreases as the ring is shifted toward the smaller ends of the rollers, so that the contact pressures increase as the speed of the driven shaft decreases.

Figure 3:
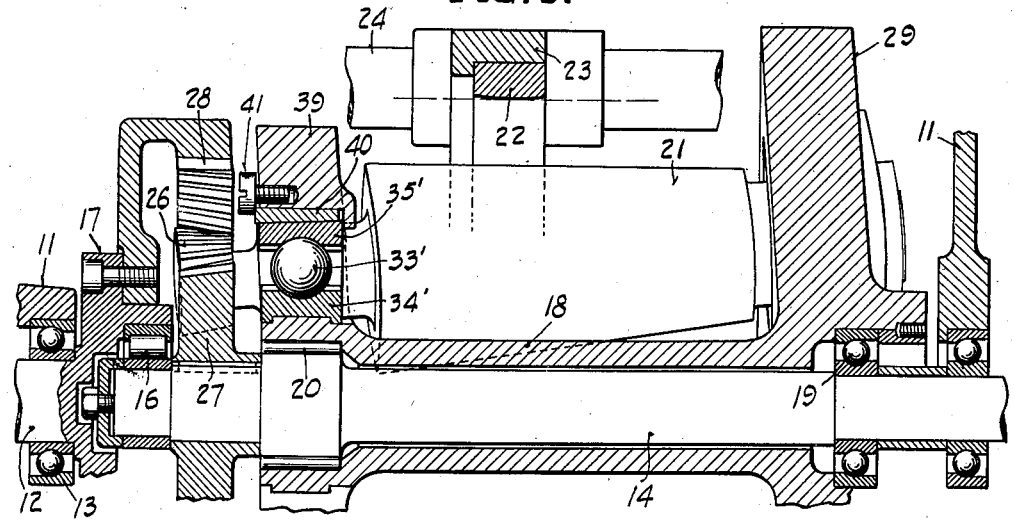
Figs. 3 and 4 are views similar to Figs. 1 and 2, respectively, of a variable speed transmission embodying the present invention in different form.
Figure 4:
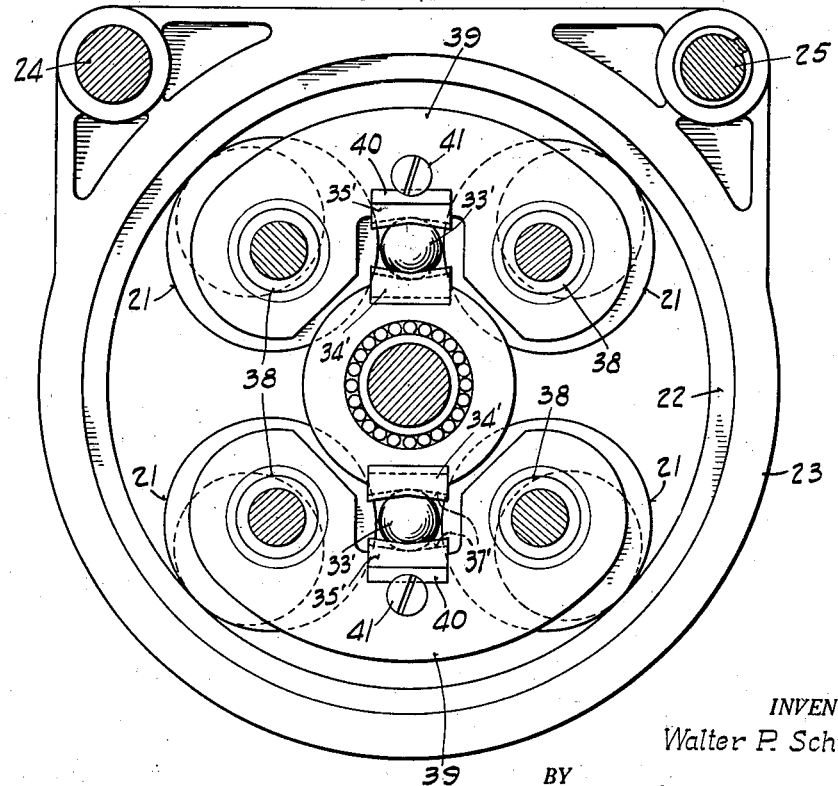

The transmission shown in Figs. 3 and 4 is similar in structure and function to that shown in Figs. 1 and 2 except that, instead of individual bearing blocks for the large ends of the rollers, the rollers 21 are arranged in pairs with the large ends of the rollers of each pair journalled in bearings 38 provided in the opposite ends of a yoke 39.

Each yoke 39 is shown rockably supported intermediate its ends upon a ball 33' interposed between cam plates 34' and 35' fixed to the rotor 18 and yoke, respectively, and confined in cam grooves 37' formed in the plates. The cam grooves 37' are so shaped as to be deeper at their mid-points than at their ends and they coact with the balls 33' and through the yokes 39 to hold the pairs of rollers 21 against the encircling contact ring 22.

In this instance a tapered shim or wedge 40 is interposed between each plate 35' and associated yoke 39 for purposes of adjustment, to take up slackness due to wear or otherwise, and to determine the degree of initial contact pressures between the rollers 21 and ring 22. Any appropriate means, such as a screw 41, may be employed for adjusting and retaining the wedge 40.

It will be noted that the transmission, with this modified form of roller mounting, functions in substantially the same way and with the same advantages as the form shown in Figs. 1 and 2.
In addition, however, each ball 33' provides a floating fulcrum for its associated yoke 39 and the yoke, thus rockably mounted, functions to equalize the contact pressures between the ring 22 and the pair of rollers supported by the yoke.

Various changes may be made in either of the embodiments of the invention hereinabove specifically described without departing from or sacrificing the advantages of the invention as defined in the appended claims.

I claim:

1. In a variable speed transmission the combination of a rotor, a plurality of tapered planetary rollers rotatable about individual axes inclined and movable relative to said rotor, a non-rotatable control ring for contact with said rollers and shiftable lengthwise thereof to regulate their planetary action, and torque responsive means for forcing said rollers against said ring to thereby automatically vary the contact pressures between said ring and rollers in accordance with changes in torque.

2. In a variable speed transmission the combination of a rotor, a plurality of tapered planetary rollers rotatably and rockably supported thereby, control means contacting said rollers and shiftable lengthwise thereof, and torque responsive means for forcing said rollers laterally against said control means to thereby automatically vary the contact pressures between said control means and roller in accordance with changes in load on said transmission.

3. In a variable speed transmission the combination of a rotor, a plurality of tapered planetary rollers radially swingable therein, a non-rotatable control ring for contact with said rollers and shiftable lengthwise thereof to regulate their planetary action, and torque responsive means for forcing said rollers against said control ring to thereby vary the contact pressures between said control ring and rollers in accordance with variations in torque load.

4. In a variable speed transmission the combination of a rotor, a plurality of tapered planetary rollers rotatable and displaceable therein, control means contacting said rollers and adjustable to regulate the speed ratio of the transmission, and torque responsive cam means between said rollers and rotor for varying the contact pressures between said control means and said rollers to thereby render the torque capacity of the transmission responsive to the torque load.

5. In a variable speed transmission the combination of a rotor, a plurality of planetary members carried thereby, control means adjustable to regulate the speed ratio of the transmission, and torque responsive cam means between said rotor and members for varying the torque capacity of the transmission in response to variations in torque load.

6. In a variable speed transmission the combination of a rotor, a plurality of tapered planetary rollers rotatable with and with respect to said rotor, an encircling control ring for contact with said rollers and movable lengthwise thereof to regulate their planetary motion, and means mounting said rollers in said rotor with one end of each radially fixed and the other radially movable, said mounting means including torque responsive cam means operable to urge said rollers outwardly and thereby induce pressure contact between said rollers and ring.

7. In a variable speed transmission the combination of driving and driven members, a rotor, a plurality of tapered planetary rollers rotatable and laterally movable in the latter, control means contacting said rollers and shiftable lengthwise thereof, means including gears connected with said rollers for connecting the latter to said driven member, and torque responsive pressure inducing means disposed between said rollers and rotor for automatically varying the contact pressures between said rollers and control means.

8. In a variable speed transmission the combination of a rotor, a plurality of tapered inclined rollers each rockably supported at one end therein, an encircling control ring for contact with said rollers and movable lengthwise thereof, and torque responsive means for urging the other ends of said rollers outwardly to effect pressure contact between said rollers and ring.

9. In a variable speed transmission the combination of a rotor, a plurality of tapered rollers each fulcrumed at one end in said rotor, an encircling contact ring coacting with said rollers and shiftable lengthwise thereof, movable supports for the other ends of said rollers, and cam means coacting with said supports for forcing said rollers outwardly against said ring.

10. In a variable speed transmission the combination of a rotor, a plurality of tapered rollers each journalled at one end in said rotor, a ring encircling and contacting said rollers and shiftable lengthwise thereof, a movable support for the other end of each roller, and cam means including balls at opposite sides of each of said supports for pressing said rollers against said ring.

11. In a variable speed transmission the combination of a rotor, a plurality of pairs of tapered rollers each journalled at one end in said rotor, a ring encircling and contacting said rollers and shiftable lengthwise thereof, a movable support for each pair of rollers at the other ends thereof, and cam means including a ball interposed between a mid-point of each support and said rotor for pressing said rollers against said ring.

12. In a variable speed transmission the combination of a rotor, a plurality of tapered rollers each journalled at one end therein, a ring encircling and contacting said rollers and shiftable lengthwise thereof, movable supports for the other ends of said rollers, and cam means between said rotor and supports for pressing said rollers against said ring, said last named means including wedge means adjustable to regulate the degree of initial pressure between said rollers and ring.

13. In a variable speed transmission the combination of a circular control element, a longitudinally tapered rotary member inclined with respect to the axis of said element, means mounting said member for revolution about said axis and in rolling engagement with said element, said member and said element being relatively moveable to regulate the speed ratio of said transmission, and cam means between said member and said mounting means for urging said member toward said element to induce pressure contact therebetween.

WALTER P. SCHMITTER.